Apr. 17, 1923.
H. TERNES
STOCK WATERER
Filed Oct. 13, 1922
1,452,325
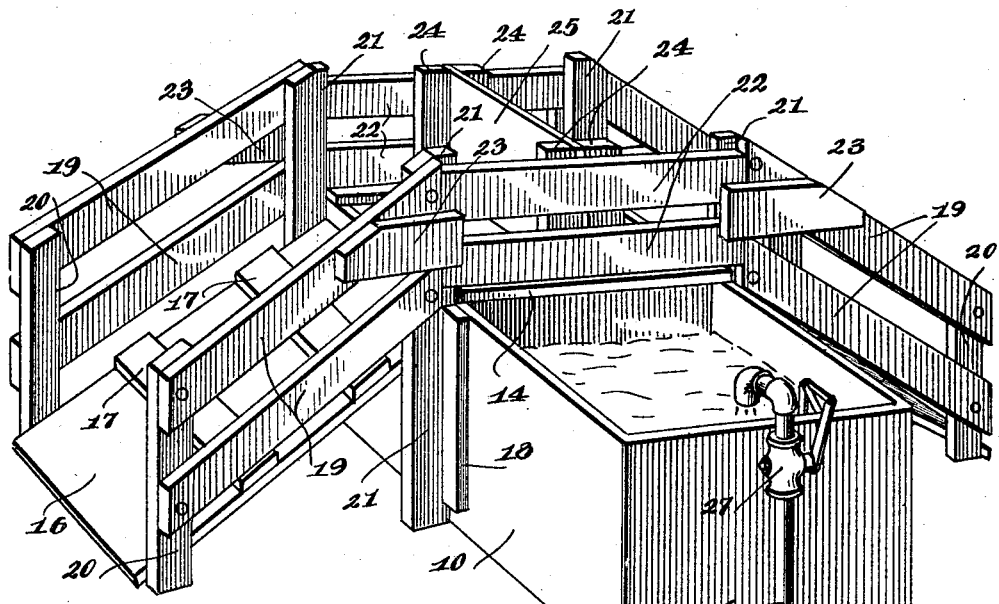
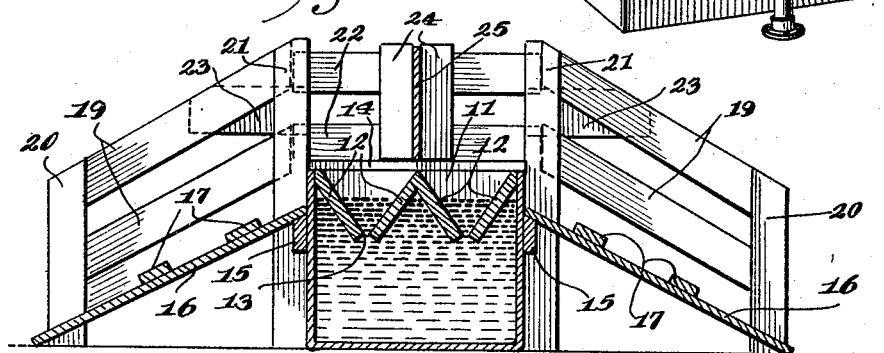
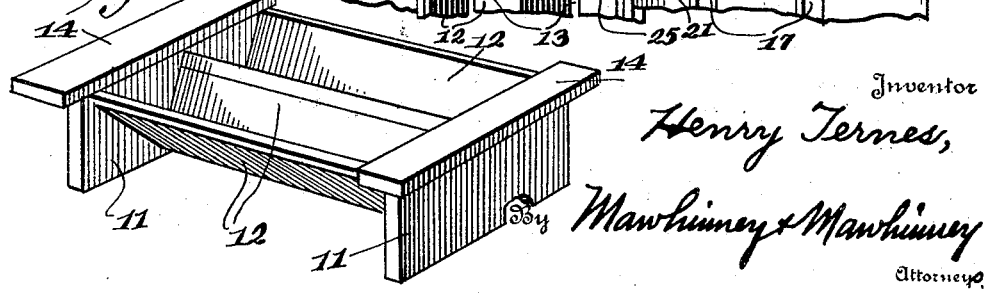
Inventor
Henry Ternes,
By Mawhinney & Mawhinney
Attorneys Patented Apr. 17, 1923.

1,452,325

UNITED STATES PATENT OFFICE.

HENRY TERNES, OF ALBION, NEBRASKA.

STOCK WATERER.

Application filed October 13, 1922. Serial No. 594,228.

*To all whom it may concern:*

Be it known that HENRY TERNES, a citizen of the United States, residing at Albion, in the county of Boone and State of Nebraska, has invented certain new and useful Improvements in Stock Waterers, of which the following is a specification.

The present invention relates to watering devices for hogs and cattle and has more particular reference to a device for attachment to tanks for regulating and maintaining clean the quantity of water to which the animals have access.

An object of the present invention is to provide an attachment for watering tanks to prevent animals and fowls from falling into the tank; to prevent splashing of the water, to affect the settling of mud and the like in the bottom of the tank; to maintain a certain portion of the water relatively clean for drinking purposes; and to provide means of easy and individual access to the water of the tank by the animals.

A further object of the invention is to provide a tray adapted for attachment to a tank for fitting into one end of the tank at the top thereof, the tray having downwardly converging troughs therein with relatively narrow slits or openings in their bottoms, the tray being adapted to receive the upper portion of the body of water therein to prevent the animals and fowls from falling into the tank and from disturbing the water to any appreciable extent, the slots in the bottoms of the troughs permitting the settling of mud or other foreign substance out of the troughs and into the bottom of the tank so as to keep water in the troughs relatively clean and in drinking condition.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of a tank watering device constructed according to the present invention.

Figure 2 is a transverse section taken through the same relatively to the tank.

Figure 3 is a fragmentary top plan view of one end of the device, and

Figure 4 is a detail perspective view of the drinking tray removed.

Referring more particularly to the drawing 10 designates a tank of any suitable construction and dimensions and which as shown is of elongated rectangular construction, adapted to receive a quantity of water for supplying animals and fowls therewith. The tank 10 is placed upon the ground or any other suitable support and the devices of this invention are assembled within and upon the tank to accomplish the various objects of this invention.

The tank is provided near its top and at one end with a drinking tray shown in detail in Figure 4. The tray comprises a pair of end pieces 11 between which extend pairs of downwardly converging side pieces 12 of wood or the like secured at opposite ends to the end piece 11 and being spaced slightly apart at their lower ends to form slots 13 through which water, mud and the like may freely pass. There are preferably two pairs of these side pieces 12, each pair forming a trough, one for each side of the tank 10. The end pieces 11 of the tray are capped by ledges 14 which lie horizontally across the end piece 11 and extend beyond the outer sides of the same and also beyond the ends of the pieces 11 for the purpose of overlapping the top edges of the sides and the adjacent end of the tank 10. The trough is thus seated or suspended in the top of the tank and may be quickly removed or replaced relatively thereto when it is desired to clean out the tank 10.

Each side of the tank 10 is provided with a horizontal cleat 15 adapted to receive upon its upper edge the upper end of a treadway 16. The treadway 16 may comprise one or more boards arranged longitudinally and secured together by transverse tread strips 17 adapted to permit the animal to gain a footing when climbing the tread 16. The opposite sides of the tank 10 are also provided with vertical cleats 18 spaced a slight distance from the opposite ends of the horizontal cleats 15 to form grooves or recesses therebetween. The approaches or treads 16 are preferably closed in on opposite sides by the side rails 19 which at their lower or outer ends are connected to posts 20 and at their inner or upper ends are mounted upon posts 21. These side rails 19 are spaced apart vertically and are adapted to swing upon their connections at opposite ends with the posts 20 and 21. The posts 21 are relatively long or high and are adapted to extend from the ground to a point appreciably above the top of the tank 10 so as to support the rails 19 in their proper positions at the sides of the approaches or treadways 16. As shown the treadways 16 are preferably broader at their lower or outer ends than at their upper inner ends and the side rails 19 are consequently flared outwardly from the opposite sides of the tank 10. The posts 21 of the side rails are of sufficient weight to snugly fit in the grooves or trays formed between the cleats 16 and 18 and these cleats are adapted to hold the posts in upright position and also support the side rails against any pressure of animals which come into contact with the side rails.

The side rails 19 are substantially continued across the opposite ends of the tray and this is effected by the provision of intermediate side rails 22 which engage at opposite ends against the outer faces of the posts 21 and which abut the inner ends of the side rails 19. The intermediate rails 22 are held against the posts 21 by cleats 23 which are secured against the outer faces of the side rails 19 and extend inwardly therefrom to form together with the upper ends of the posts 21, seats or pockets into which the intermediate rails 22 may fit.

The intermediate rails 22 are held in vertically spaced apart relation by pairs of cross pieces 24 which are spaced apart slightly to form vertical slots when the device is set up for the reception of the opposite ends of an intermediate partition 25. The partition 25 is arranged immediately over the central portion of the tray and thus separates the troughs of the tray so that access may be had to the troughs individually from their respective sides only. The tank 10 is supplied with water from any suitable source, such as from a pipe 26 and the water may be controlled by a valve 27 or other suitable means for maintaining the desired surface level of the water in the tank.

After the various parts have been set up upon the tank 10 and water has been placed in the tank, the device is ready for use by hogs, cattle and the like. The animals are adapted to approach the opposite sides of the tank 10 by walking up the treadway 16 to an extent sufficient to permit the animal to place its head in the adjacent trough. When mud and the like is carried by animals to the troughs and is washing into the water the mud is permitted to settle downwardly in the trough and through the slots 13 in the bottom thereof, the mud settling in the bottom of the tank.

It is apparent, as the troughs are separated from the interior of the tank, that any splashing or water disturbance in the trough cannot be communicated to the bulk of water in the tank and consequently the sediment in the bottom of the tank cannot be easily agitated. Further, the animals, fowls or the like which drink from the trough cannot fall into the tank.

It is obvious that various changes and modifications may be made in the details of construction and design of the above specifically described embodiment of this invention without departing from the spirit thereof, such changes and modifications being restricted only by the scope of the following claims.

What is claimed is:

1. In an animal watering device, a tank adapted to contain a body of water, a tray fitting in the top of the tank and having a trough at each side thereof, and approaches arranged at opposite sides of the tank one for each trough.

2. In an animal watering device, a tank, a tray fitting in the top of the tank and having troughs in opposite sides, said troughs having openings in their bottoms from which sediment may settle to the bottom of the tank, and approaches leading to the opposite sides of the tank one for each trough.

3. In an animal watering device, a tank for water, a tray removably fitted in the tank and having a trough at each side dipping into the water in the tank, each tray having a longitudinal slot in its bottom through which water may enter the tray and through which sediment may escape to the bottom of the tank, approaches arranged at opposite sides of the tank and leading to the troughs, and a central partition arranged between the troughs and above the tray.

4. In an animal watering device, a tank adapted to contain water a tray removably fitting in the tank and comprising pairs of downwardly converging pieces spaced at their lower ends to provide troughs with slots in their bottoms, said troughs being adapted to dip into the body of water for receiving water through the slots thereof and for permitting sediment to settle in the bottom of the tank, approaches arranged at opposite sides of the tank and including treads and side rails, intermediate rails arranged across the opposite ends of the tray and above the same, and an intermediate partition carried by said intermediate rails.

5. In an animal watering device, a tank adapted to contain water, a tray detachably seated in the top of the tank and having independent troughs with slots in their bottoms adapted to dip into the water, treads arranged at opposite sides of the tank, side rail members arranged at opposite sides of the treads, intermediate rails arranged across the upper ends of the tray and between the side rail members, and a partition carried by said intermediate rails and extending centrally over said tray for separating the troughs.

In testimony whereof I affix my signature.

HENRY TERNES.